United States Patent [19]

Rosey et al.

[11] 4,118,639

[45] Oct. 3, 1978

[54] ELECTRICAL SWITCHBOARD APPARATUS INCLUDING BUS SYSTEM WITH INDIVIDUAL PHASE ISOLATION

[75] Inventors: Richard Rosey, Plum Borough; George N. Kovatch, Monroeville, both of Pa.; Ned H. Simon, Queeny Township, St. Louis County, Mo.

[73] Assignee: Westinghouse Electric Corp., Pittsburgh, Pa.

[21] Appl. No.: 755,540

[22] Filed: Dec. 30, 1976

[51] Int. Cl.$^2$ .............................................. H01B 7/28
[52] U.S. Cl. ................................. 307/147; 174/99 B; 361/378
[58] Field of Search ................ 307/147; 361/341, 342, 361/361, 378, 355; 174/88 B, 99 B, 149 B, 70 B, 71 B, 72 B

[56] References Cited

U.S. PATENT DOCUMENTS

| | | | |
|---|---|---|---|
| 2,906,808 | 9/1959 | Krauss | 174/72 B |
| 3,219,887 | 11/1965 | Gerg et al. | 361/378 |
| 4,031,433 | 6/1977 | Olashaw | 361/338 |

Primary Examiner—Robert K. Schaefer
Assistant Examiner—Morris Ginsburg
Attorney, Agent, or Firm—Robert E. Converse, Jr.

[57] ABSTRACT

An electrical distribution switchboard including a multiphase horizontal main bus and a multiphase vertical riser bus. A plurality of protective members are provided, each being vacuum formed from a thermoplastic carbonate-linked polymer material. Separate protective members are provided for each individual phase conductor of the horizontal and vertical bus.

21 Claims, 18 Drawing Figures

ELECTRICAL SWITCHBOARD APPARATUS INCLUDING BUS SYSTEM WITH INDIVIDUAL PHASE ISOLATION

CROSS-REFERENCE TO RELATED APPLICATIONS

The present invention is related to copending United States patent applications Ser. No. 756,035, entitled "Electrical Switchboard Apparatus Including Welded Bus Connector" filed Dec. 30, 1976 by G. N. Kovatch, R. Rosey, and N. H. Simon; Ser. No. 756,036, entitled "Electrical Switchboard Apparatus Including Double Flanged Vertical Riser Conductors" filed Dec. 30, 1976 by G. N. Kovatch, R. Rosey, N. H. Simon, and N. A. Tomasic; and Ser. No. 755,705, entitled "Electrical Switchboard Apparatus With Center Fed Vertical Riser Bus" filed Dec. 30, 1976 by G. N. Kovatch and R. Rosey. All of the above-mentioned copending U.S. patent applications are assigned to the assignee of the present invention.

BACKGROUND OF THE INVENTION

1. Field of the Invention

The invention relates to electrical switchboard apparatus and more particularly to switchboards having isolated bus systems.

2. Description of the Prior Art

An electrical distribution switchboard distributes the main incoming power among various site functions such as heating, lighting, and air conditioning. It typically consists of a number of vertical cabinet sections containing circuit breakers for switching and protecting the various load circuits. Three-phase electrical power enters the switchboard via cable or bus duct connected to a main bus which runs horizontally within the switchboard between the various sections. The main bus is connected to vertical, or riser, bus in each vertical cabinet section. Various circuit breakers stacked vertically within the cabinet have their inputs connected to the vertical riser bus and their outputs connected to horizontal load side extensions which run toward the rear of the cabinet perpendicular to the main horizontal bus. Bus duct or cable is then attached to the load side extensions to permit the power to exit the switchboard and flow to the load (air conditioning, lights, motors, etc.).

The primary requirements of a switchboard are that it be safe and dependable and that it exhibit low cost in construction, installation, and maintenance. Insulation in most switchboards is provided by physical separation of the various components at high potential, according to the requirements of Underwriters Laboratories. However, it is often desired to protect and isolate components at high potential from contact with tools, dust or other contaminating material, and pests such as insects or rodents.

Early investigations of switchgear bus systems have demonstrated that when bus insulation is in intimate physical contact with major surfaces of the conductors, the insulated bus will run at a cooler temperature than bare bus. Various methods of providing such contact are known in the prior art, such as coating the bus bar conductors using a fluidized bed process or an electrostatic spray painting process. Taping of the individual conductors will also provide very tight insulation. However, many disadvantages exist with these methods, such as relatively expensive capital equipment investment, difficulty of field installation or repair, and difficulty of applying insulation to a welded assembly. Glass polyester moldings have also been used to provide isolation for prior art switchboards. Although the actual material cost of glass polyester is moderate, the tooling and labor costs required for injection molding of this material are very high.

It is therefore desirable to provide an electrical switchboard having a protective insulation/isolation system which requires minimum tooling cost, a minimum number of parts, low assembly costs, favorable heat transfer characteristics, and minimum capital equipment and facilities investment.

SUMMARY OF THE INVENTION

In accordance with a preferred embodiment of the present invention, there is provided electrical power distribution switchboard apparatus comprising a cabinet and a multiphase horizontal main bus mounted within the cabinet and connected to a source of electrical power, the main bus comprising a plurality of spaced parallel individual horizontal phase conductors. A multiphase vertical riser bus is also provided, mounted within the cabinet and connected, through circuit interrupter apparatus, to an electrical load. The vertical riser bus comprising a plurality of individual vertical phase conductors. Means are provided for connecting the horizontal main bus and the vertical riser bus. A plurality of molded protective members are mounted upon and individually enclose each individual horizontal and vertical phase conductor, whereby the individual phase conductors are electrically isolated from each other. The protective members are vacuum formed of material consisting essentially of a thermoplastic carbonate-linked polymer.

BRIEF DESCRIPTION OF THE DRAWINGS

For a better understanding of the invention, reference may be had to the preferred embodiment exemplary of the invention shown in the accompanying drawings, in which.

DESCRIPTION OF THE PREFERRED EMBODIMENT

Figure 1:
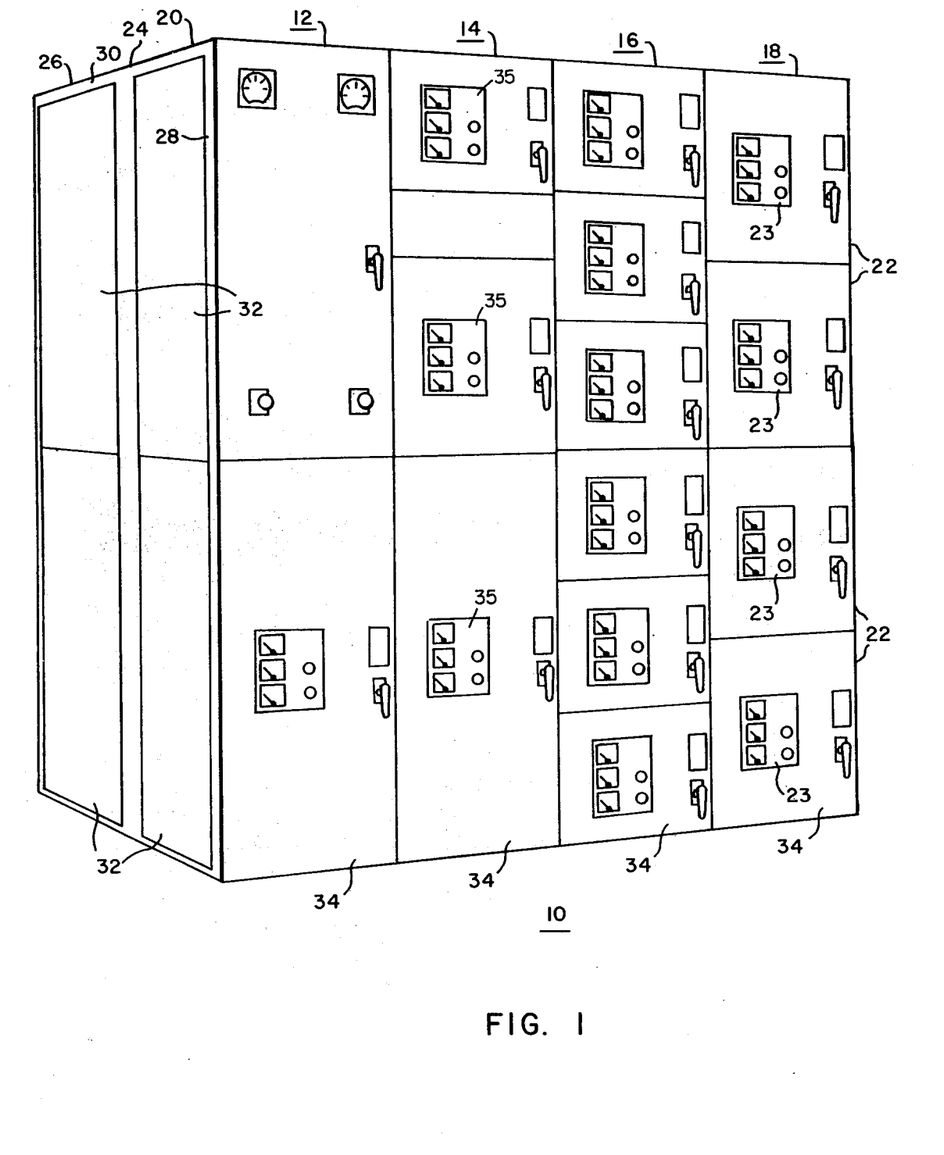
FIG. 1 is a perspective view of a four-section electrical power distribution switchboard.

Referring now to the drawings, in which like reference characters refer to like components, FIG. 1 shows an electrical distribution switchboard 10 having four vertical section structures 12, 14, 16, and 18. Each of the sections of the switchboard 10 includes a device compartment 20 separated into cells 22, a bus compartment 24, and a cable compartment 26. Each of the cells 22 contains circuit interrupters or instruments used in controlling or monitoring electrical circuits powering loads such as air conditioners, motors, lights, etc.

Generally, each of the vertical sections 12, 14, 16, 18 comprise structural members such as 28 and 30 to which cover sheets 32 and doors 34 are added. Circuit breaker controls and indicators 35 are accessable through the doors 34 to operate and indicate the status of the enclosed circuit breakers.

Incoming main power is connected to a main bus which runs horizontally through the bus compartments 24 of the board 10 connecting the sections 12, 14, 16, 18. The circuit breakers in each section are then connected to the horizontal bus through riser bus extending vertically in the bus compartments of each of the sections 12, 14, 16, 18.

Figure 3:
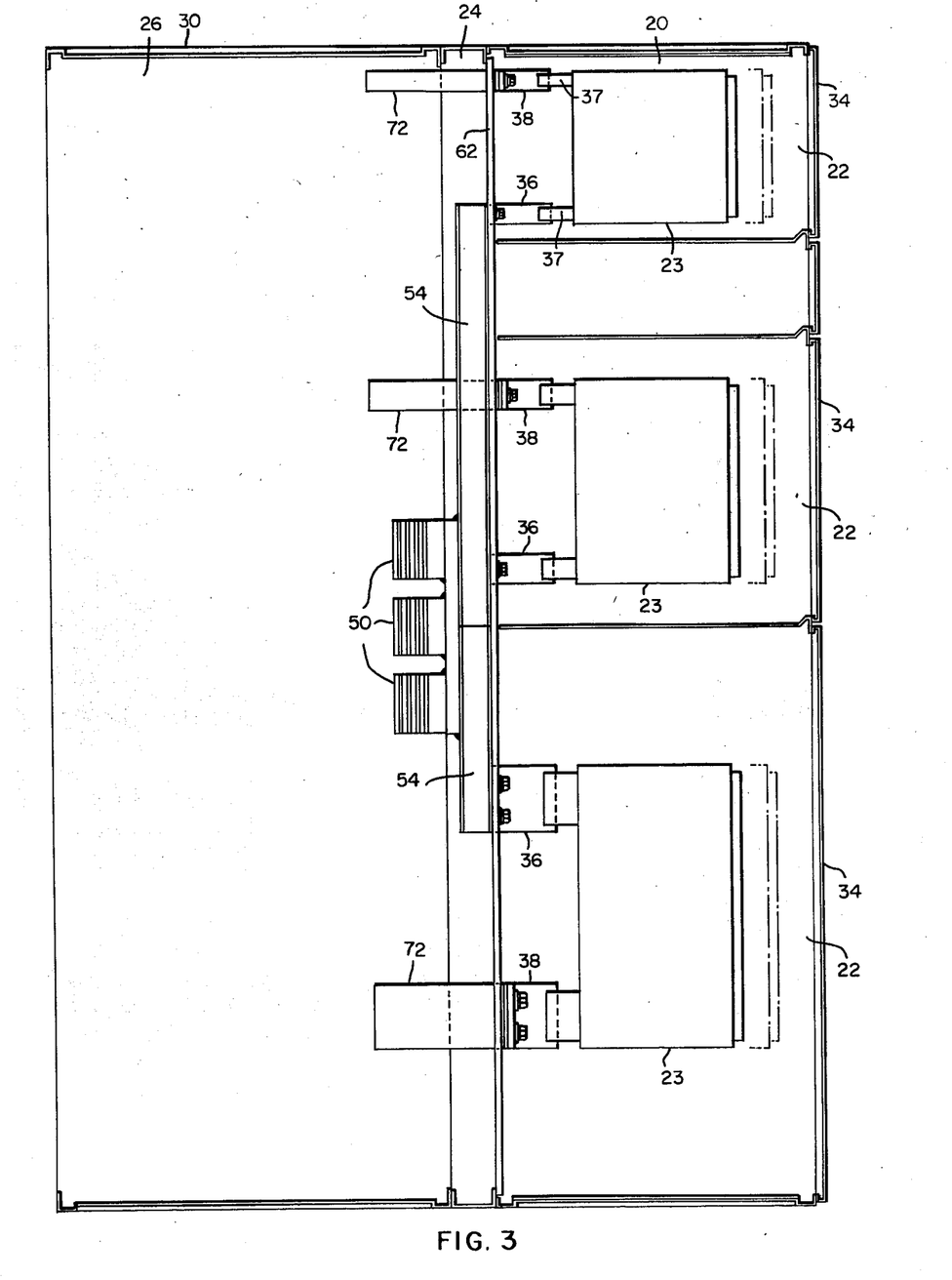
FIG. 3 is a side view of one section of the switchboard of FIG. 1.
Figure 6A:
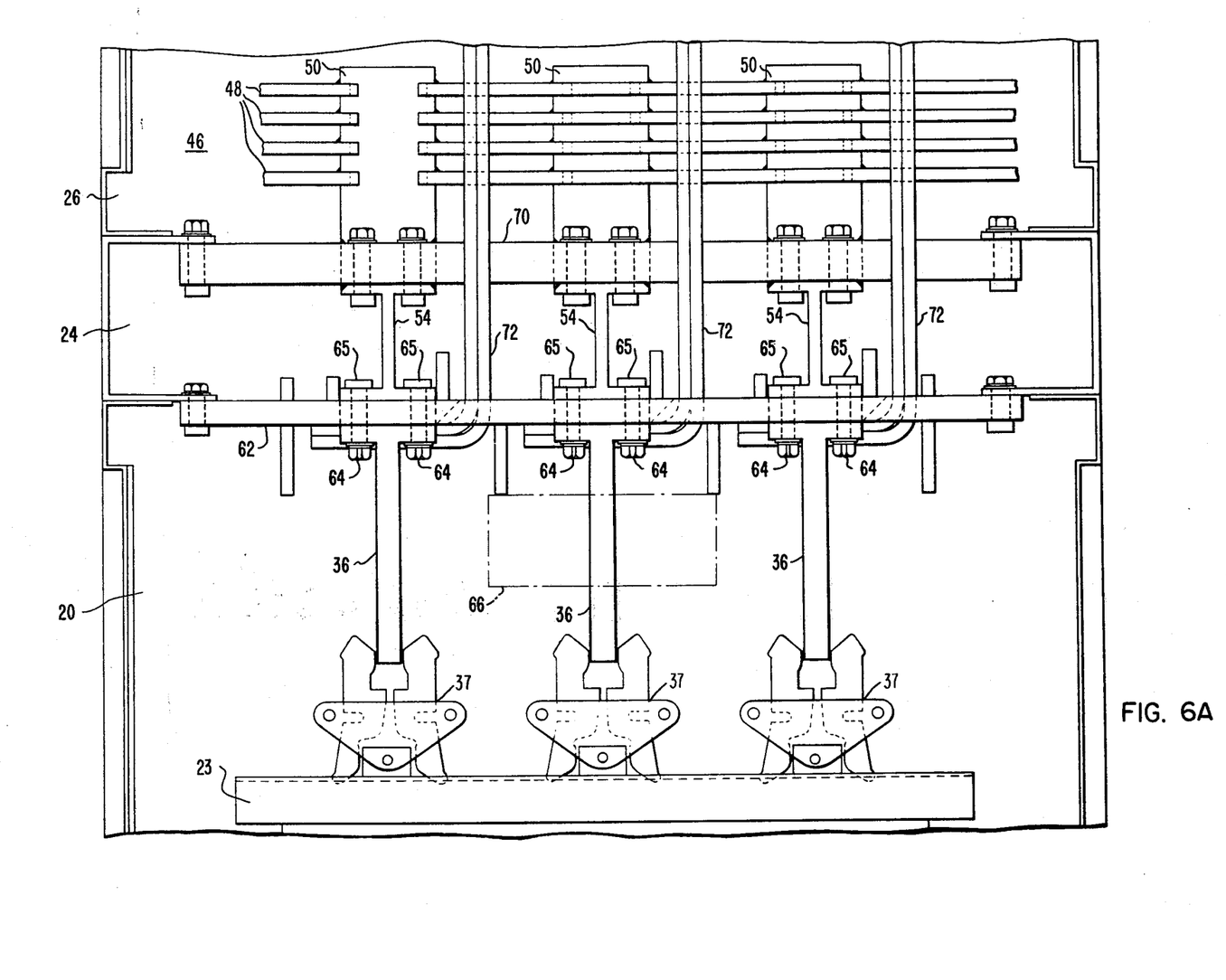
FIG. 6A is a detail sectional view of the switchboard section of FIG. 5, taken along the line A—A of FIG. 5.
Figure 6B:
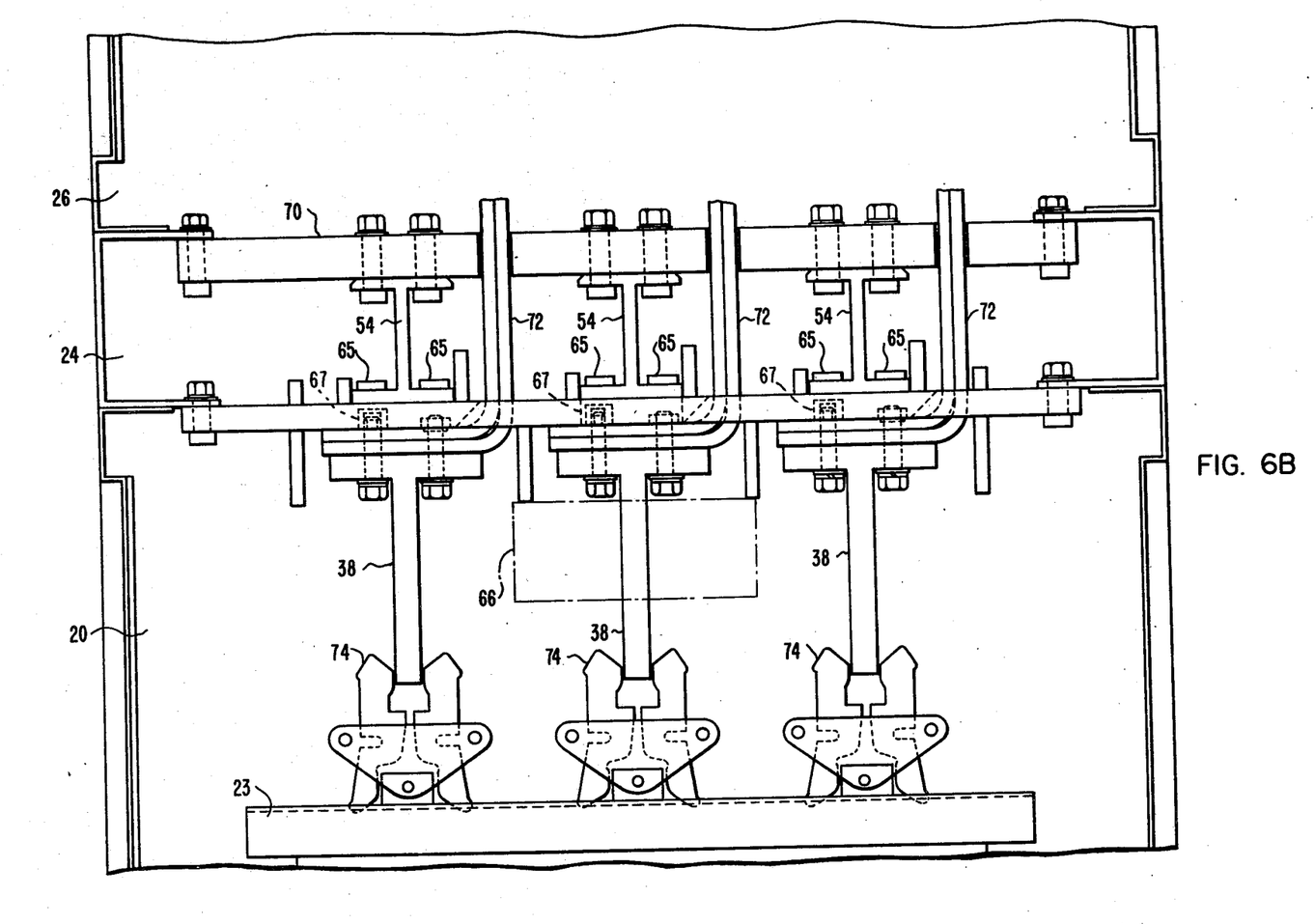
FIG. 6B is a sectional view similar to FIG. 6A taken along the line B—B of FIG. 5.

As can be seen in FIGS. 3, 6A, and 6B, each of the circuit breakers 23 includes movable sliding contact connectors, or finger assemblies, 37 cooperating with line stab connectors 36 and load stab connectors 38. The interaction of the fixed stabs 36, 38 and the movable finger assemblies 37 provides sliding contact connection allowing the circuit breakers to be inserted and withdrawn from the cells 22. Other means providing such sliding contact connection could, of course, be used. The line stabs 36 which are connected to the vertical riser bus supply incoming power to the separable contacts within the circuit breaker, from which the power then flows outward through the load stabs 38 and load side runbacks 72 to the distribution circuits and loads which will ultimately be supplied.

Figure 2:
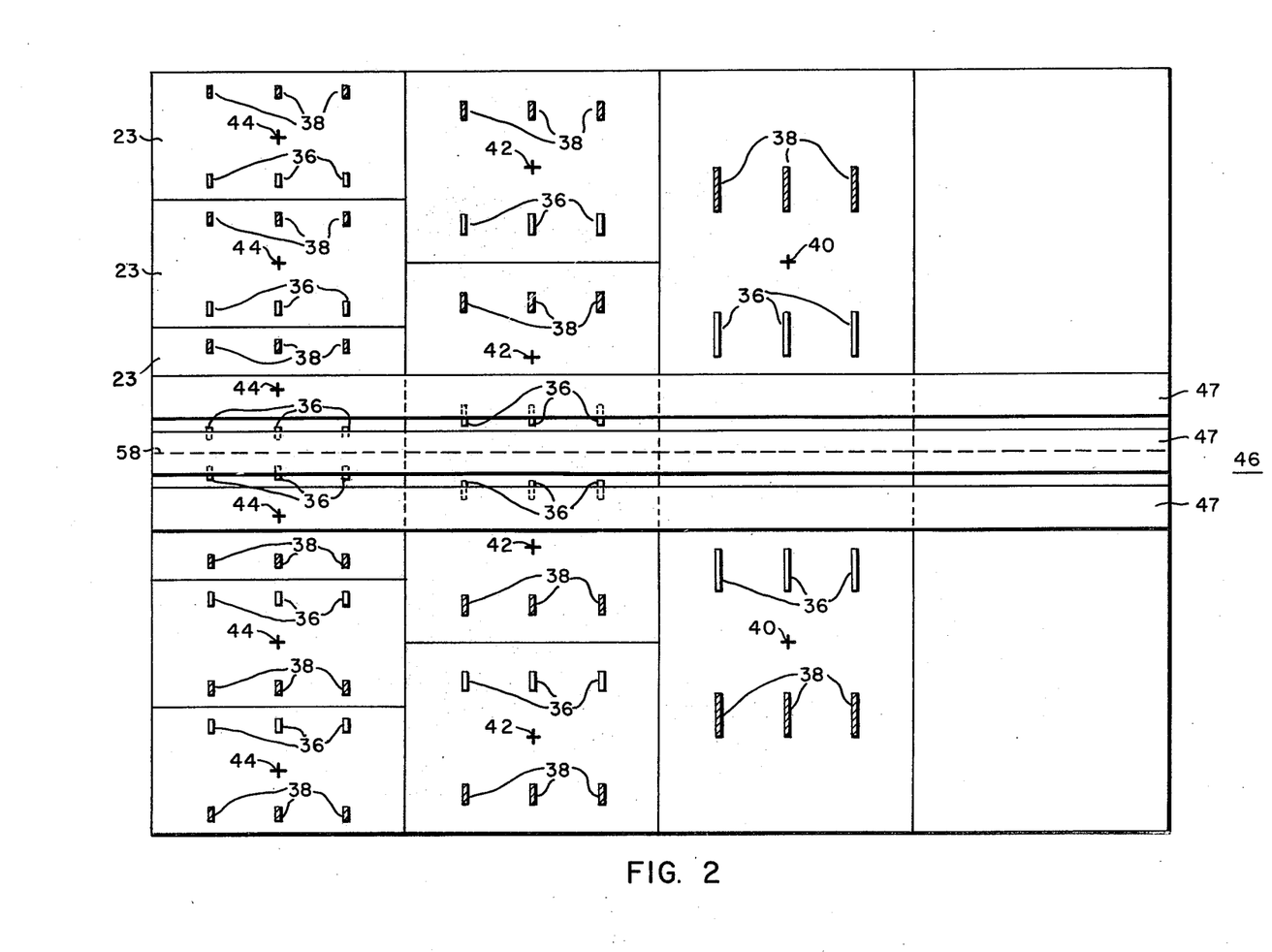
FIG. 2 is a diagrammatic view of an electrical switchboard employing the principles of the present invention, showing the locations of load and line connectors for a variety of circuit breaker frame sizes.

As can be seen in FIG. 3, a variety of circuit breaker frame sizes must be provided for. It is desirable to design the bus structure to be compatible with such a variety and mix of circuit breaker frame sizes while at the same time utilizing a minimum amount of material and simplifying the installation of the switchboard. Prior art switchboards often provided for three different locations for the horizontal bus: at the top, the center, and the bottom of the switchboard, the location of the horizontal bus being dependent upon the location and frame size mix of the circuit breakers to be included in each individual switchboard and, specifically, the location of the load side connection. The load side runbacks extend back through the bus compartment and into the cable compartment, complicating the bus layout, since required insulation clearances must be maintained. FIG. 2 (a diagram not related to the specific circuit breaker configuration of FIG. 1) shows the locations of the line and load side stab connectors 36 and 38 for three different circuit breaker frame sizes, 3,000 ampere, 1,600 ampere, and 800 ampere, and the respective breaker horizontal centerlines 40, 42 and 44. The hatched rectangles indicate the location of load stabs 38. Above the horizontal centerline 58 of the switchboard are conventional circuit breakers which are bottom fed, that is, circuit breakers with the input line side stabs 36 at the bottom and the output load side connections 38 at the top. By employing these normal circuit breakers above the horizontal centerline of the vertical section structure and by using top, or reverse, fed circuit breakers below the horizontal bus centerline, it can be seen that an area around the horizontal centerline becomes free of load side connectors 38 and runbacks 72. This then becomes the ideal position to locate the three phase conductors of the horizontal bus 46.

Figure 4:
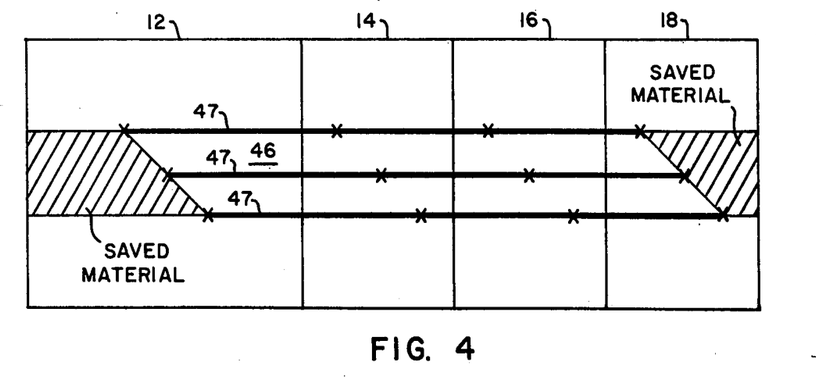
FIG. 4 is a diagrammatic view of the horizontal main bus of the four-section switchboard of FIG. 1.

It is also desirable to reduce the amount of material employed in the horizontal bus structure. FIG. 4 shows a diagrammatic rear view of the horizontal bus structure of the switchboard of FIG. 1. As can be seen, three conductor members of horizontal bus supply the four vertical structures 12, 14, 16, 18, with each section being connected at either end to corresponding vertical individual phase conductors of adjacent riser bus sections. Splice points are indicated by X's on FIG. 4 and occur at the point of connection between corresponding individual phase conductors of the horizontal and vertical bus. By using such connections instead of structure-width conductor members spliced at structure boundaries, considerable savings in material can be realized.

Figure 5:
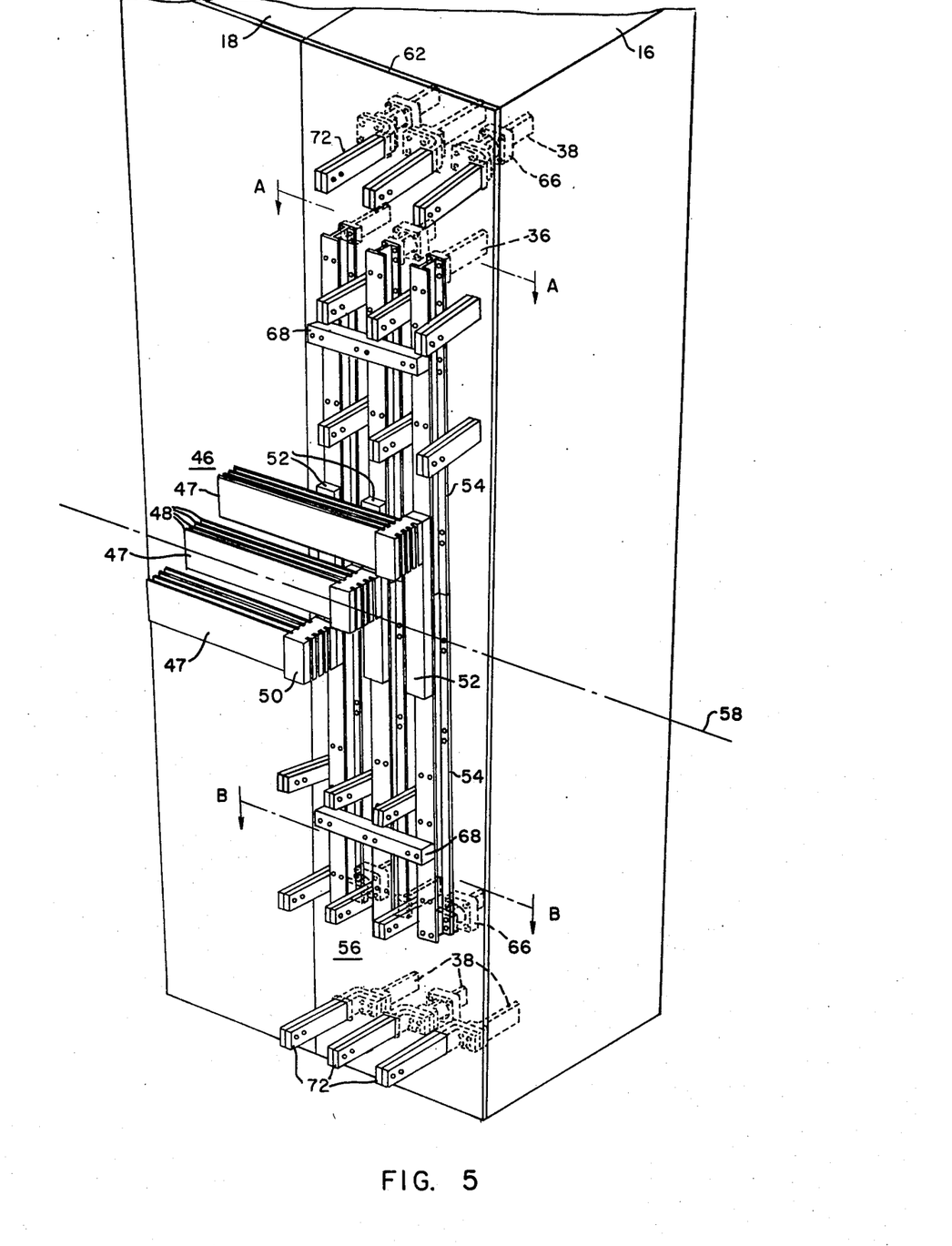
FIG. 5 is a perspective view of the junction between the horizontal main bus and the vertical riser bus of a single section of the switchboard of FIG. 1.
Figure 7A:
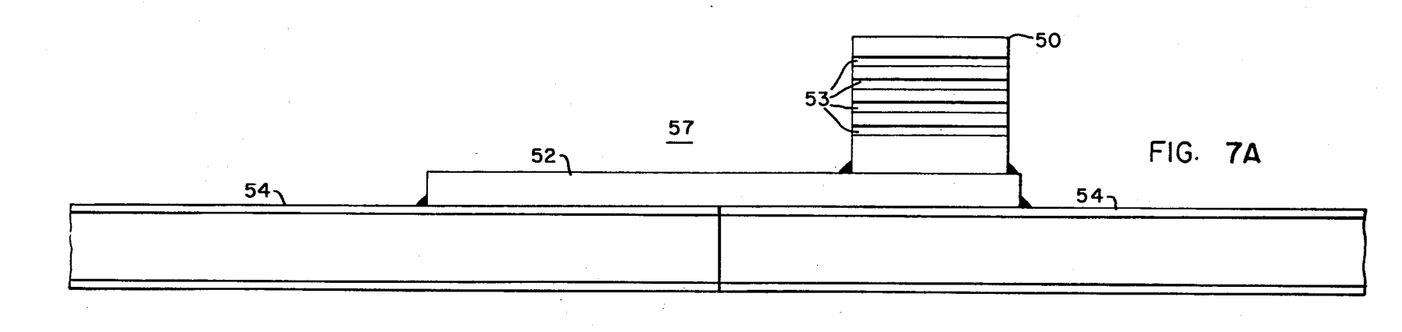
FIG. 7A is a side view of a phase A vertical phase conductor.
Figure 7B:
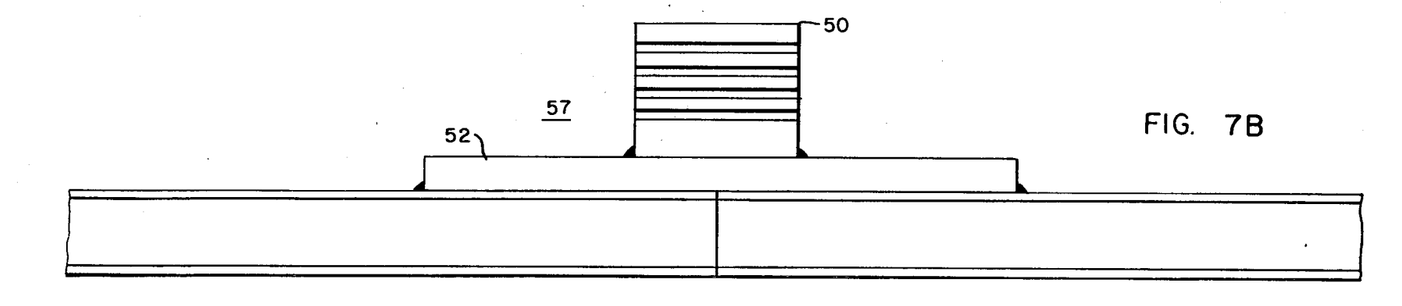
FIG. 7B is a side view of a phase B vertical phase conductor.
Figure 7C:
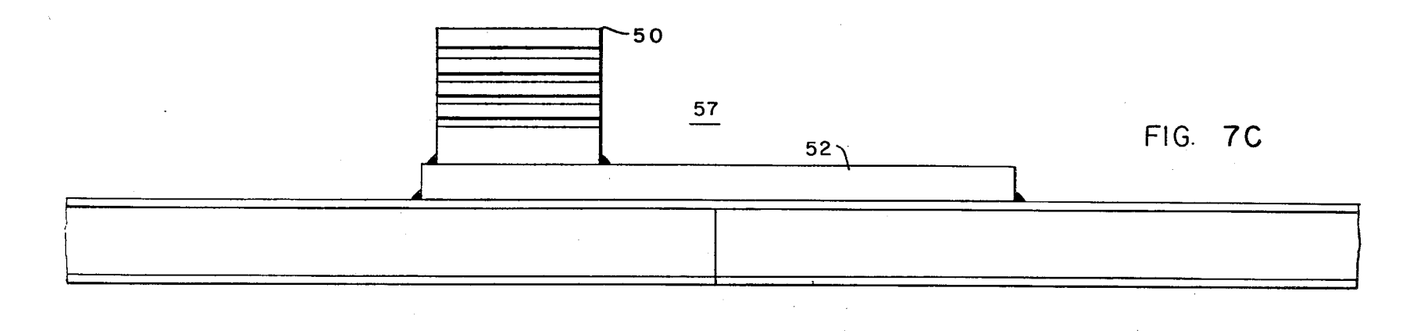
FIG. 7C is a side view of a phase C vertical phase conductor.
Figure 7D:
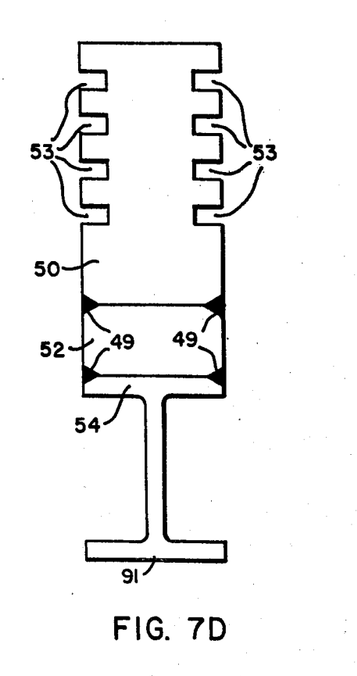
FIG. 7D is an end view of any of the vertical phase conductors shown in FIGS. 7A–7C.

In order to minimize the number of different parts required for a variety of switchboard combinations, and to minimize the required cross-section of the vertical riser bus, it is desirable to supply power to the vertical riser bus at its geometric and its electrical center. This is accomplished in the present invention through the use of a tie member, or tie maker bar 52, as is shown in FIG. 5, a perspective view of the bus junction of section 16 of the switchboard of FIG. 1. Various parts have been omitted from FIG. 5 in order to more clearly indicate the method of connecting the vertical and horizontal bus. The tie maker bar 52 is a generally rectangularly sectioned aluminum extrusion having chamferred edges 49 (FIG. 7D) to facilitate welding to I-beams 54 and a connector block 50.

Figure 8:
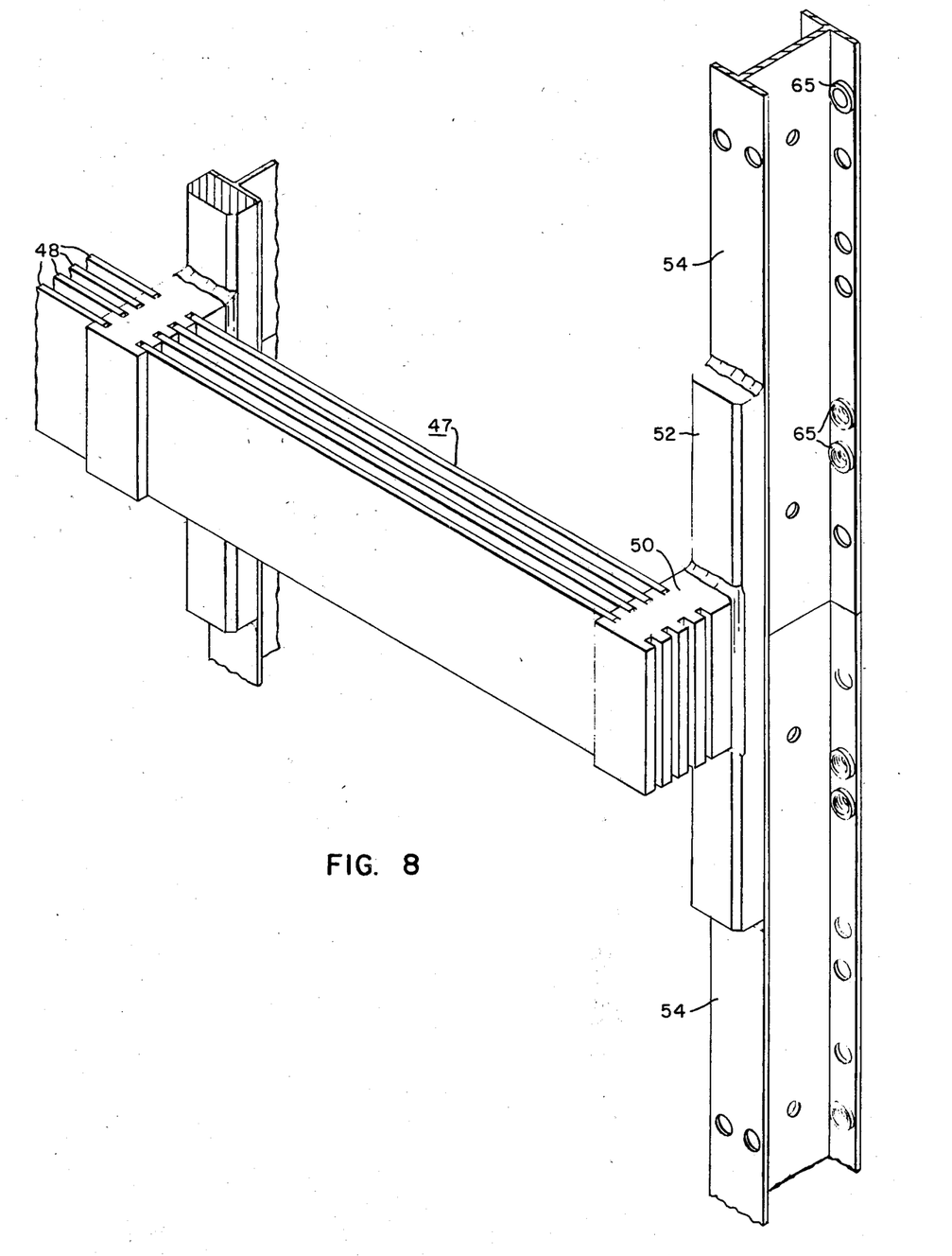
FIG. 8 is a detail perspective view of one phase of the bus junction shown in FIG. 5.

As can be seen most clearly in FIG. 8, each individual phase conductor 47 of the main horizontal bus 46 comprises four spaced parallel aluminum bars 48 welded through the connector block 50 to the tie maker bar 52 which is in turn welded to a pair of I-beams 54 to form an individual phase conductor 57 of the vertical riser bus 56. The two I-beams 54 each have front and rear flanges connected by a web portion and are symmetrically disposed on either side of the centerline 58 of the main horizontal bus 46. Similarly, each tie maker bar 52 of each phase conductor 57 of the vertical riser bus 56 is similarly disposed with its top and bottom symmetrically located above and below the horizontal main bus centerline 58 and approximately even with the upper edge of the upper horizontal phase conductor and the lower edge of the lower horizontal phase conductors, respectively. The connector 50 of phase A is seen to be welded to the top portion of its associated tie maker bar 52, while the connector 50 of phase C is welded to the lower portion of its associated tie maker bar 52. The phase B connector is welded to the center of its associated tie maker bar. This can be seen more clearly in FIGS. 7A through 7C, which are side views of the vertical phase conductors of phases A, B, and C, respectively.

The length of the tie maker bar 52 is determined by the amount of available contact area between it and the I-beams, 54 which is in turn determined by the weld bead area. In all cases, however, maximum benefits are obtained where the tie maker bar 52 is located approximately symmetrical with respect to the horizontal bus centerline 58.

As can be seen in FIG. 5, connections for three 800 ampere circuit breakers mounted above the centerline 58 of the horizontal main bus 46, are bottom-fed through the upper I-beams 54 of the associated vertical riser bus 56, and through tie maker bars 52 to the horizontal main bus 46. Similarly, the lower three circuit breaker connections are connected to the main horizontal bus below the centerline 58 through the bottom I-beams of the associated vertical riser bus 56 and are top-fed. The disclosed construction employing a tie maker bar 52 allows each vertical phase conductor 57 to be fed at its electrical and its geometric center. This allows a single extrusion to be used interchangeably as either the upper half of the vertical phase conductor 57 or the lower half. Similarly, no I-beam 54 is required to carry more than half of the total current which could be supplied through the associated vertical section structure. Of course, for some section configurations it is not necessary to use a full length of I-beam, such as when only a single breaker is to be mounted in the top or bottom half of a section. The two I-beams may also be welded together in certain applications.

The construction of the connector block 50 is shown most clearly in FIGS. 5, 6A, 7A–7D, and 8. The connector block 50 is formed from a generally rectangularly cross-sectioned aluminum extrusion with a plurality of locating means such as the rectangularly sectioned channels, or grooves, 53 formed laterally along the largest side surface of the connector block 50. The top and bottom I-beams 54, the tie maker bar 52, and the connector 50 are assembled at a bench location to form each vertical phase conductor 57 of the vertical riser bus 56. Each of the three vertical phase conductors 57 for each vertical section structure is mounted (in the manner to be hereinafter described) to a glass polyester insulating barrier 62 disposed between the device compartment 20 and the bus compartment 24. The horizontal bars 48 are then welded to the connector 50 in the grooves 53 beginning with the groove closest to the tie maker bar 52. The remaining bars 48 are then welded one by one between the connecting blocks 50 of the corresponding phases of adjacent vertical structures. The connector block 50 allows the horizontal bars 48 to be easily located in the proper position during assembly, thereby maintaining the desired spacing between bars. This spacing is provided to reduce the amount of material necessary for a given current carrying capacity of the main horizontal bus, since it has been found that a plurality of parallel spaced conductors is more efficient than a single conductor of the same cross-sectional area. No jig fixture is required to hold all bars in position prior to welding since the bars are positioned one at a time rather than requiring two or more bars to be welded together. In certain cases where maximum current carrying capacity is not required, one or more grooves can be left blank, thereby increasing the spacing between the remaining bars. Tapering of the main horizontal bus is also easily accomplished with the grooved connector 50 by bringing the desired number of bars into the connector 50 on one side and attaching a fewer number of bars on the opposite side, downstream from the power source.

The main horizontal bus 46 is entirely supported by the vertical riser bus 56. Thus, the main horizontal bus can be composed of conducting members equal in length to the spacing between like phases of adjacent vertical riser bus, with mechanical and electrical connections being made only at the ends of the members. This saves considerable material over the section width bus system, as is shown in FIG. 4.

It is not necessary for the connector blocks 50 to have a rectangular cross-section. For example, the sides could converge in steps, with the widest step at the point where the connector block 50 is welded to the tie maker bar 52 and the narrowest step at the top of the block farthest from the tie maker bar 52, thereby forming a "Christmas tree" cross-section. While the benefits obtainable through the use of the tie maker bar are not limited to bus systems employing the grooved connector 50, it has been found that increased versatility and reduced assembly cost result from the use of the connector block 50 as shown and disclosed herein.

Similarly, it is not necessary to employ the tie maker bar construction in order to obtain the benefits provided by the grooved connector block 50. However, the tie maker bar provides a simple and effective means for feeding the vertical riser bus at its geometric and electrical center. These same tie maker bar benefits are also obtained when used in bolted systems.

The insulating glass polyester barrier 62 separates the device compartment 20 and the bus compartment 24. The I-beams 54 of the vertical riser bus 56 are mounted to the glass polyester barrier by bolts 64 passing through the barrier 62 from the device compartment side thereof. The bolts 64 are threaded into fluted press nuts 65 inserted from the rear into holes in the front flange of the I-beams 54. As the bolts 64 are tightened, the I-beams 54 are secured to the polyester barrier 62.

The line stab connectors 36 for the circuit breakers 23 are similarly fastened to the front flange of the I-beams 54 with bolts and press nuts, while the load stab connectors are bolted to the barrier 62 using threaded inserts 67 (FIG. 6B). The connectors 36 and 38 extend through holes in the glass polyester barrier 62 into the device compartment 20. Metering current transformers 66 are mounted upon the connectors 36 and 38 from the device compartment side of the polyester barrier 62. Since the press nuts are fixed into the flange of the I-beams 54, and the threaded inserts 67 are fixed in the polyester barrier 62, access to the press nuts and threaded inserts is not required when inserting or removing the bolts. Thus, the connectors 36 and 38 can be removed or replaced from the device compartment 20 of the switchboard, eliminating the need to deenergize the switchboard and gain access to the bus compartment 24. Since the current transformers 66 are mounted upon the connectors 36 and 38 on the device compartment side of the polyester barrier 62, they can be similarly replaced without requiring access to the bus compartment. This is an important maintenance and safety feature since it is not required to remove any of the cover sheets 32 to replace current transformers or line connectors, nor is it necessary to subject the users of the switchboard to a service interruption for deenergization, as was sometimes required in prior art switchboards.

The rear flange of the I-beams 54 secures riser support members 68, providing needed structural strength to resist forces produced under transient overload current situations. Similarly, members 70 are provided to support the load side runbacks 72 which extend rearwardly into the cable compartment 26 for connection to outgoing cables or bus duct. The members 70 are bolted to the riser bus and bus compartment structure, as seen in FIGS. 6A and 6B, and include notches, or cutouts, through which the load side runback extends. These notches provide lateral rigidity and prevent side-to-side movement of the load side runbacks 72 caused by electromagnetic forces under severe overcurrent conditions.

It can be seen therefore, that the I-shaped cross-section of the vertical riser bus 56 provides an efficient means for mechanical support of the vertical riser bus 56 and associated members while providing a high electrical current carrying capacity in a compact configuration.

Figure 9:
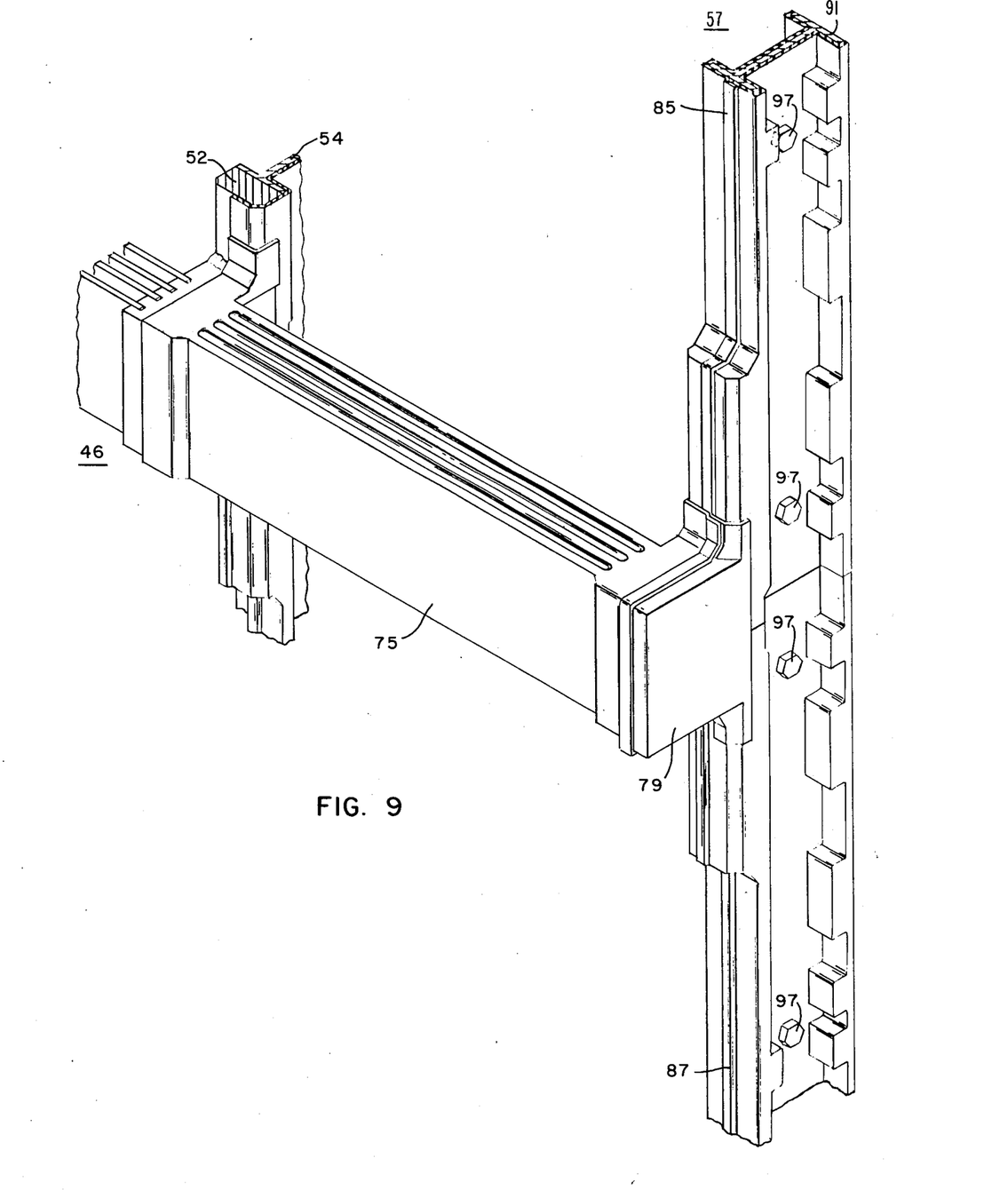
FIG. 9 is a view similar to FIG. 8 with the protective isolation components shown enclosing the individual phase conductors.

In FIG. 8 there is shown a detail perspective view of one phase of the horizontal bus 46 and vertical bus 56. FIG. 9 is a detail perspective view of the same individual conductors covered with molded thermoplastic protective members, providing insulation and isolation. The relationship of the various protective members to the phase conductors is shown in an exploded view in FIG. 10, while the details of the individual protective members are shown in FIGS. 11 through 14.

Each protective member is vacuum formed in the shape of the individual phase conductor which it will isolate. In this manner, the protective members can be held in intimate physical contact with the major surfaces of the individual phase conductors. It has been found that by providing such contact, heat produced by current flow through the conductors is more readily dissipated to the environment, resulting in a cooler running bus and a higher current capacity.

The protective members are composed of a thermoplastic carbonate-linked polymer produced by reacting bisphenol A and phosgene. This material is obtainable in commercial quantities from the General Electric Company under the trade name of Lexan. Another suitable material is that obtainable in commercial quantities from Mobay Chemical Company under the trade name Merlon. Other moldable thermoplastic materials may also be suitable.

Figure 10:
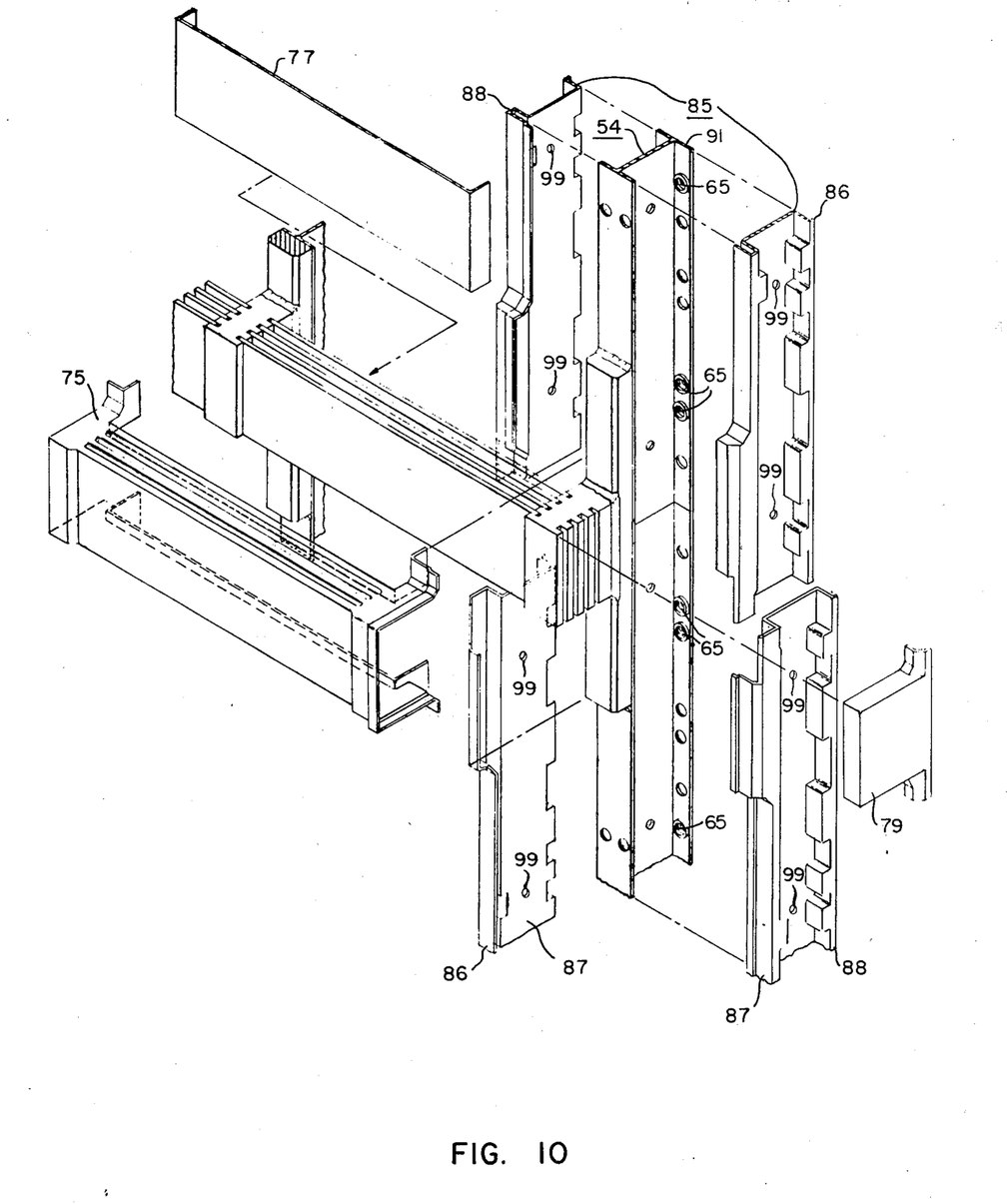
FIG. 10 is an exploded view showing the relationship of the individual protective components to the phase conductors of FIG. 8.
Figure 11:
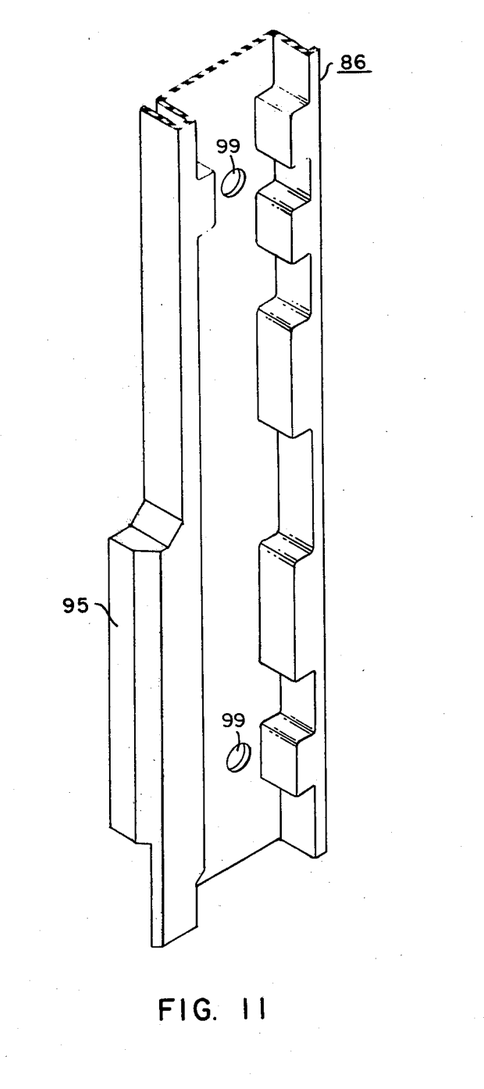
FIG. 11 is a perspective view of one vertical protective member half shell.
Figure 12:
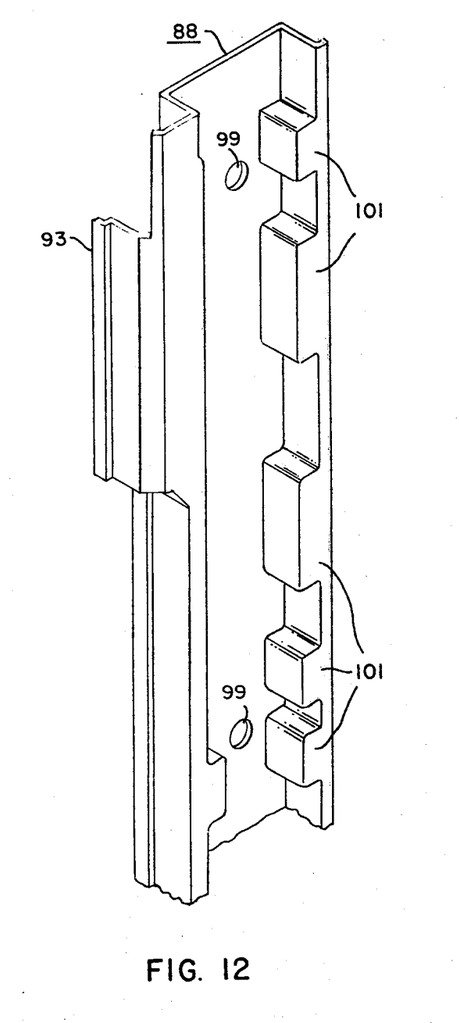
FIG. 12 is a perspective view of the other vertical protective member half shell.

As can be seen most clearly in FIG. 10, the entire bus system can be isolated using only five different moldings. The horizontal bus conductor is isolated by a generally U-shaped channel member 75, a backplate 77, and an end cap 79. The end cap 79 is used only on the end section of the switchboard, such as section 12 or 18. For intermediate sections, an additional channel member 75 is positioned in abutting, overlapping end-to-end relationship.

Figure 13:
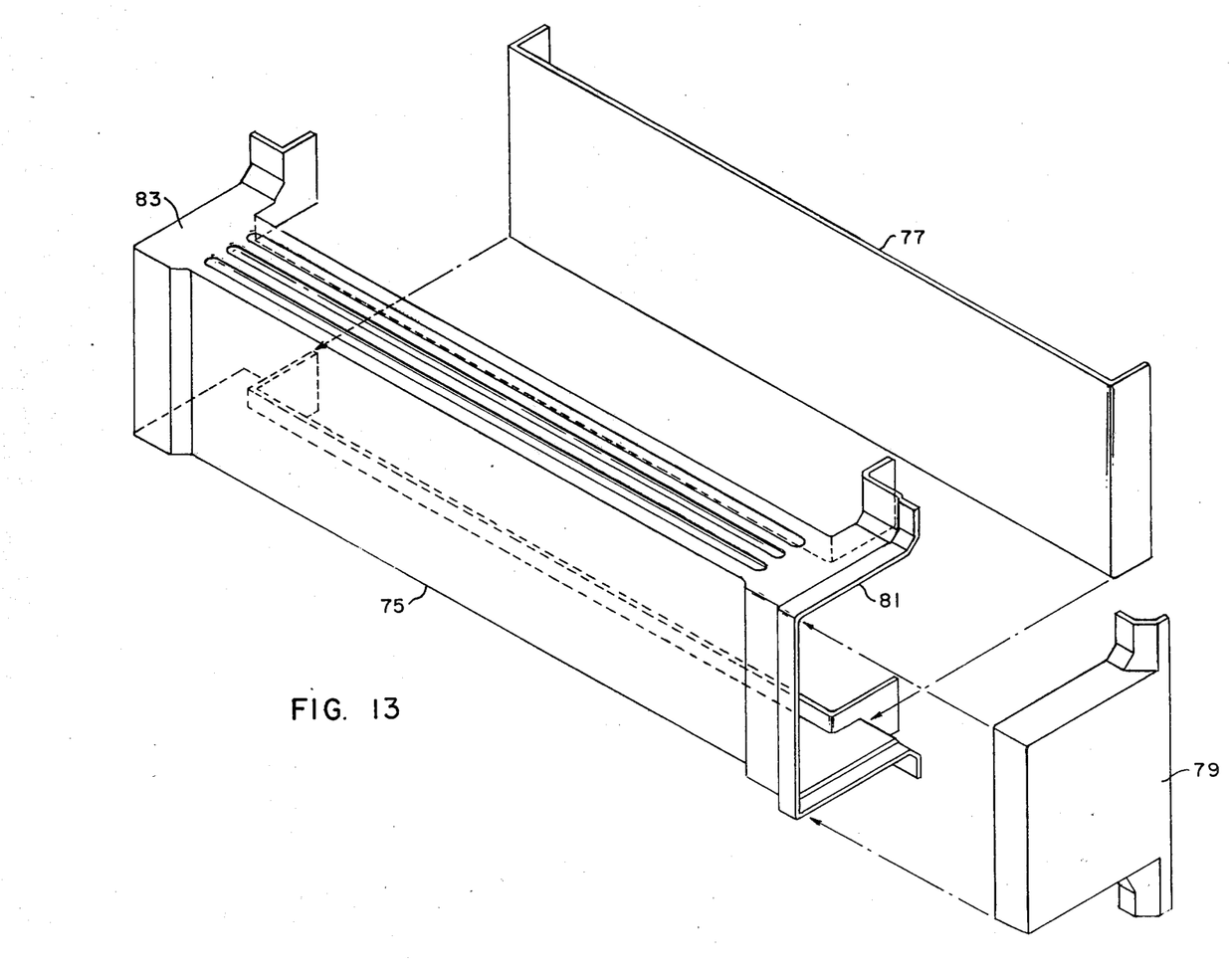
FIG. 13 is a perspective view of the channel member, backplate, and end cap protective members providing isolation for the horizontal phase conductors.
Figure 14:
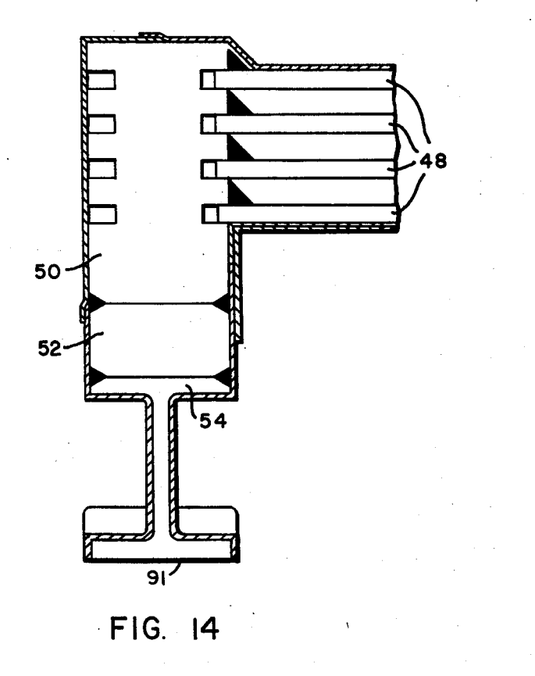
FIG. 14 is a sectional view of an individual vertical phase conductor with the protective members installed in place.

As can be seen in FIG. 13, the channel member 75 includes an overlapping lip member 81 on one end thereof, cooperating with either an end cap 79 or a tongue member 83 on the opposite back of another channel member 75. The back plate 77 is positioned over the rear surface of the individual horizontal phase conductor of the horizontal bus 46. The individual vertical phase conductors 57 are isolated by upper and lower vertical isolating members 85 and 87, each of which is composed of two cooperating half shells 86 and 88. Since the vertical conductors are generally symmetrical, it is possible to use only two different moldings to provide the four isolation members for each vertical phase conductor. Thus, the molding for the upper right half shell 86 is the same as that for the lower left half shell. Similarly, the upper left half shell 88 is the same as the lower right half shell. However, since the position of the connector block 50 on the tie maker bar 52 is different for each phase (see FIGS. 7A through C) cutouts are required to provide clearance for the connector block 50 in the three different locations of the vertical assembly.

As can be seen in FIGS. 9 and 10, the half shells 86 and 88 cooperate to completely enclose the I-beams 54, with the exception of the outer surface 91 of the front flange which is in contact with the glass polyester barrier 62. The half shells 88 also have overlapping lip portions 93 cooperating with corresponding tongue surfaces 95 of the half shells 86 to provide complete isolation and to aid in positioning the half shells. As can be seen in FIGS. 9, 10, 11, and 12, a plurality of recesses 101 are formed in the half shells 86 and 88 to provide clearance for the press nuts 65 seated in the flanges of the I-beams 54. Thus, the protective isolation system will in no way interfere with the bolting operations upon the I-beams 54.

The half shells 86 and 88 are secured to the I-beams 54 using nylon nuts and bolts 97, inserted through holes 99 punched in the half shells 86 and 88. The bolts 97 serve to maintain the half shells 86 and 88 in intimate physical contact with the major surfaces of the I-beams 54. The isolating members 75, 77, 79, 86 and 88 are sufficiently thin and flexible so as to be easily manipulated around the bus system components and placed into position, even after the entire switchboard is assembled and installed. Thus, it is possible to easily install the protective members prior to delivery of a new switchboard. Since the protective system components are of thin flexible thermoplastic carbonate-linked polymer material and are not required to perform a load bearing function, that is, they are not structural members, the entire system also can be easily added to existing switchboards installed in the field. Of course, the switchboard must be deenergized prior to such installation.

Similarly, since separate members are provided for the upper and lower I-beams, the components of the protective system are physically small, further aiding in field installation in an existing switchboard.

Tooling costs for vacuum formed thermoplastic carbonate components are much less than tooling costs for other materials such as glass polyester. This, of course, significantly reduces the cost of providing such a protective system.

It can be seen therefore that the present invention provides an electrical distribution switchboard having a protective system which results in lower surface temperatures of the bus conductors, provides isolation between individual phase conductors of the bus system, is easily added to existing switchboard structures, and minimizes material and installation costs.

We claim:

1. Electrical power distribution switchboard apparatus, comprising:

a cabinet;

a multiphase horizontal main bus mounted within said cabinet and being connected to a source of electrical power, said main bus comprising a plurality of spaced parallel individual horizontal phase conductors;

a multiphase vertical riser bus mounted within said cabinet and connected to an electrical load, said vertical riser bus comprising a plurality of individual vertical phase conductors;

means connecting said horizontal main bus and said vertical riser bus; and a plurality of molded protective members, each individual horizontal and vertical phase conductor having a plurality of said protective members mounted thereon and cooperating to separately cover major surfaces of each of said individual phase conductors, whereby said individual phase conductors are electrically isolated from each other.

2. Apparatus as recited in claim 1 wherein said protective members are molded in the shape of said individual phase conductors and are mounted in intimate physical contact with the major surfaces of said individual phase conductors.

3. Apparatus as recited in claim 2 wherein each vertical protective member comprises a pair of cooperating left and right half shells, and said vertical riser bus is symmetrically attached to said connecting means whereby a single pair of left and right half shell styles can be mounted upon said individual vertical phase conductors to extend either above or below said connecting means.

4. Apparatus as recited in claim 3 wherein one of said half shells comprises a raised lip on one edge and said other half shell comprises a flat extending tongue on one edge, said lip and tongue cooperating to position said half shells about each of said vertical individual phase conductors.

5. Apparatus as recited in claim 2 wherein said vertical individual phase conductors comprise flat extending surfaces and fastening means seated within said flat extending surfaces, and said protective members comprise a plurality of molded recesses providing clearance for said fastening means and permitting said protective members to be mounted in intimate physical contact with the major surfaces of said vertical individual phase conductors.

6. Apparatus as recited in claim 2 wherein said protective members comprise elongated channel members and elongated plate members, one of said plate and channel members cooperating to cover longitudinal surfaces of each section of individual horizontal phase conductor and maintain intimate physical contact with said longitudinal surfaces of said individual horizontal phase conductors.

7. Apparatus as recited in claim 6 wherein said protective members comprise cap members covering the end surfaces of said individual horizontal phase conductors, thereby cooperating with said plate and channel members to individually enclose said individual horizontal phase conductors.

8. Apparatus as recited in claim 1 wherein said protective members are vacuum formed from thermoplastic material.

9. Apparatus as recited in claim 8 wherein said thermoplastic material consists essentially of carbonate linked polymer material.

10. Apparatus as recited in claim 8 wherein said protective members are molded in the shape of said individual phase conductors and are mounted in intimate physical contact with the major surfaces of said individual phase conductors.

11. Apparatus as recited in claim 1 comprising means clamping said molded protective members into intimate physical contact with major surfaces of said individual phase conductors.

12. Apparatus as recited in claim 11 wherein said molded protective members are constructed of flexible electrically insulating material.

13. Apparatus as recited in claim 1 wherein said cabinet comprises a rigid insulating barrier and said individual vertical phase conductors are mounted against said barrier with a longitudinal surface in contact therewith, said vertical phase conductors individually having the remaining longitudinal surfaces thereof enclosed by said molded protective members.

14. Electrical power distribution switchboard apparatus, comprising:

a cabinet;

a multiphase horizontal main bus mounted within said cabinet and being connected to a source of electrical power, said main bus comprising a plurality of spaced parallel individual horizontal phase conductors;

a multiphase vertical riser bus mounted within said cabinet and connected to an electrical load, said vertical riser bus comprising a plurality of individual vertical phase conductors;

means for connecting said horizontal main bus and said vertical riser bus; and a plurality of semi-rigid, non-load bearing, nonsupportive protective members mounted upon and covering major surfaces of said main bus and said riser bus, whereby said vertical and horizontal individual phase conductors are electrically isolated from each other.

15. Apparatus as recited in claim 14 wherein separate protective members are mounted upon each of said individual phase conductors.

16. Apparatus as recited in claim 15 wherein said protective members are constructed of flexible electrically insulating material.

17. Apparatus as recited in claim 16 wherein said protective members are vacuum formed of thermoplastic material.

18. Apparatus as recited in claim 17 wherein said thermoplastic material consists essentially of cabonate linked polymer material.

19. Apparatus as recited in claim 14 wherein said protective members are constructed of flexible electrically insulating material.

20. Apparatus as recited in claim 19 wherein said protective members are vacuum formed of thermoplastic material.

21. Apparatus as recited in claim 20 wherein said thermoplastic material consists essentially of carbonate linked polymer material.

* * * * *